United States Patent
Hardiman

(10) Patent No.: US 10,552,879 B1
(45) Date of Patent: Feb. 4, 2020

(54) REAL-TIME ASSESSMENT TOOL TO DETERMINE VALUATION OF ROLLING STOCK

(71) Applicant: Jason Hardiman, Mountain View, CA (US)

(72) Inventor: Jason Hardiman, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 569 days.

(21) Appl. No.: 15/221,575

(22) Filed: Jul. 27, 2016

(51) Int. Cl.
*G06Q 30/02* (2012.01)
*G06Q 40/00* (2012.01)

(52) U.S. Cl.
CPC ......... *G06Q 30/0278* (2013.01); *G06Q 40/12* (2013.12)

(58) Field of Classification Search
CPC .... G06Q 30/0278; G06Q 40/12; G06Q 10/20; G06Q 10/0637
USPC ..... 705/30, 306, 307, 7.36, 4, 38, 40, 14.29; 701/22; 320/109
See application file for complete search history.

(56) References Cited

U.S. PATENT DOCUMENTS

| | | | | |
|---|---|---|---|---|
| 8,326,710 B2* | 12/2012 | Ernst | ...................... | G06Q 40/00 705/1.1 |
| 2003/0233323 A1* | 12/2003 | Bilski | ................... | G06Q 20/102 705/40 |
| 2005/0267774 A1* | 12/2005 | Merritt | ............... | G06Q 10/0637 705/306 |
| 2007/0067228 A1* | 3/2007 | Furman | .................. | G06Q 10/10 705/31 |
| 2010/0205017 A1* | 8/2010 | Sichelman | ............. | G06Q 10/02 705/5 |
| 2010/0274657 A1* | 10/2010 | Workman | .............. | G06Q 30/00 705/14.29 |
| 2013/0031029 A1* | 1/2013 | Davidson | ............... | G07B 15/06 705/412 |
| 2013/0339219 A1* | 12/2013 | Bernheimer | ........... | G06Q 40/02 705/38 |

(Continued)

*Primary Examiner* — Vanel Frenel
(74) *Attorney, Agent, or Firm* — Ferguson Braswell Fraser Kubasta PC

(57) ABSTRACT

A method, system, and non-transitory computer readable medium for determining a real-time valuation of a rolling stock vehicle. The method may include obtaining weather data from a weather data source, load data from a load data source, grade data from a grade data source, and damage data from a damage data source; performing a determination of a rate of depreciation for the rolling stock vehicle; calculating, for a trip, a current valuation based at least in part on the weather data, the load data, the grade data, the damage data, the rate of depreciation, trip mileage data, and trip time data; and upon exiting a taxing jurisdiction: calculating, for a taxing jurisdiction across a network in real-time, a taxing jurisdiction exiting valuation for the taxing jurisdiction based at least in part on the weather data, the load data, the grade data, the damage data, the rate of depreciation, taxing jurisdiction mileage data, taxing jurisdiction time data, and taxing jurisdiction mapping data; and providing the current valuation and the taxing jurisdiction exiting valuation to a business management application (BMA), where the current valuation and the taxing jurisdiction exiting valuation are used to determine a tax amount owed during a tax period.

18 Claims, 4 Drawing Sheets

(56) References Cited

U.S. PATENT DOCUMENTS

| | | | |
|---|---|---|---|
| 2014/0344097 A1* | 11/2014 | Horowitz | G06Q 30/0611 |
| | | | 705/26.4 |
| 2015/0154709 A1* | 6/2015 | Cook | G06Q 40/08 |
| | | | 705/4 |
| 2016/0358129 A1* | 12/2016 | Walton | G06Q 10/20 |
| 2017/0186326 A1* | 6/2017 | Rennie | H04W 4/029 |

* cited by examiner

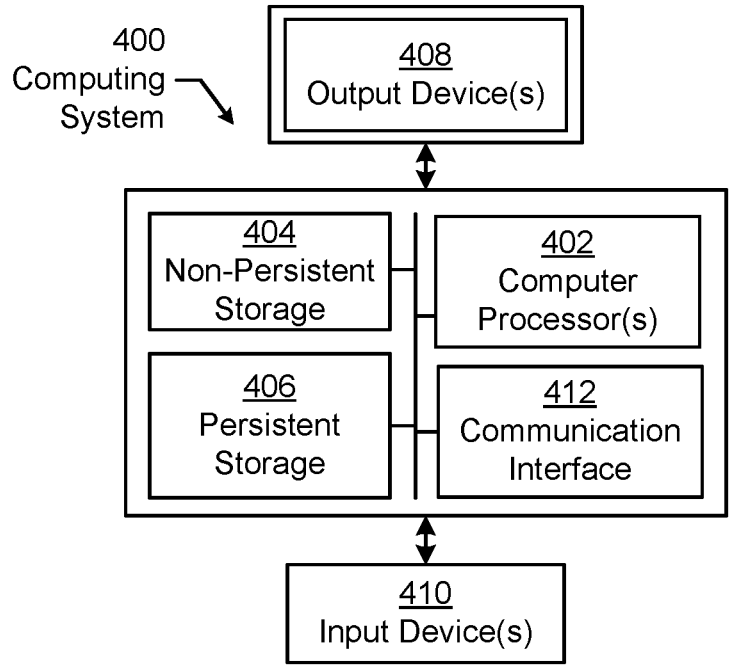
FIG. 4.1
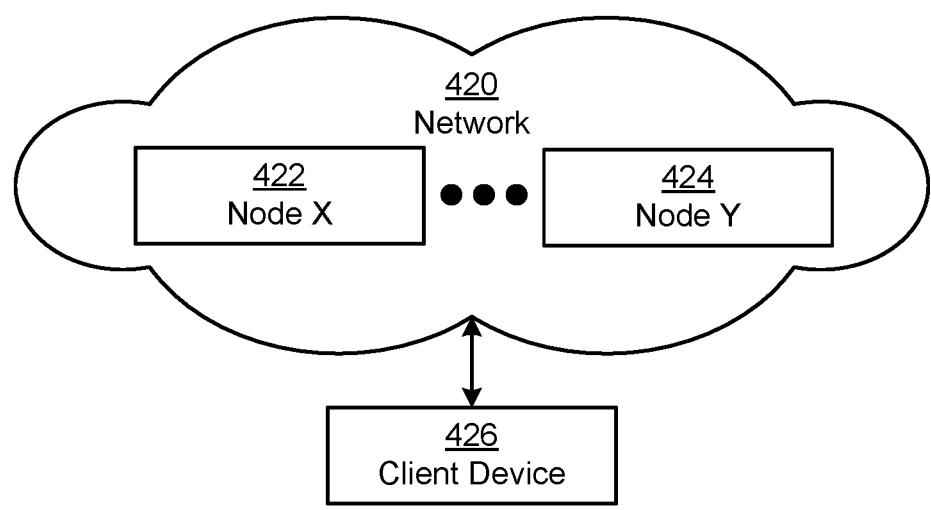
FIG. 4.2

REAL-TIME ASSESSMENT TOOL TO DETERMINE VALUATION OF ROLLING STOCK

BACKGROUND

Entities (e.g., individuals, companies, etc.) that use wheeled vehicles, also known as rolling stock (e.g., trucks, trains, or other wheeled vehicles used by businesses) are often required to pay taxes in a variety of taxing jurisdictions at various times throughout a given period of time. The amount of tax owed in a given jurisdiction is often based, at least in part, on the valuation of the rolling stock while located in or passing through the jurisdiction. Such valuations are commonly made by the owner and/or operator, or by a professional assessor. Valuations made by an owner or operator may be inaccurate and/or subject to possible audit by a taxing entity. Valuations made by professional assessors may be expensive. Either type of assessment of the valuation of rolling stock commonly occurs annually, meaning that the valuation used to determine tax amounts owed in various jurisdictions does not change (i.e., depreciate) throughout the year as the rolling stock is used and depreciating in value.

SUMMARY

In general, in one aspect, embodiments of the invention relate to a method for obtaining weather data from a weather data source, load data from a load data source, grade data from a grade data source, and damage data from a damage data source; performing a determination of a rate of depreciation for the rolling stock vehicle; calculating, for a trip, a current valuation based at least in part on the weather data, the load data, the grade data, the damage data, the rate of depreciation, trip mileage data, and trip time data; and upon exiting a taxing jurisdiction: calculating, for a taxing jurisdiction across a network in real-time, a taxing jurisdiction exiting valuation for the taxing jurisdiction based at least in part on the weather data, the load data, the grade data, the damage data, the rate of depreciation, taxing jurisdiction mileage data, taxing jurisdiction time data, and taxing jurisdiction mapping data; and providing the current valuation and the taxing jurisdiction exiting valuation to a business management application (BMA), wherein the current valuation and the taxing jurisdiction exiting valuation are used to determine a tax amount owed during a tax period.

In general, in one aspect, embodiments of the invention relate to a system that includes a rolling stock vehicle valuation tool operatively connected to a weather data source, a load data source, a grade data source, and a damage data source, the rolling stock vehicle valuation tool comprising: a processor and a memory; a geolocation identification module operatively connected to a geolocation data source and configured to obtain geolocation data corresponding to a rolling stock vehicle; a time module configured to provide time data corresponding to the rolling stock vehicle; a rolling stock vehicle valuation data repository comprising weather data obtained from the weather data source, load data obtained from the load data source, grade data obtained from the grade data source, damage data obtained from the damage data source, mileage data obtained from the geolocation identification module, time data obtained from the time module, taxing jurisdiction data, rate of depreciation data, and rolling stock vehicle valuation data; a network configured to communicate with a taxing jurisdiction in real-time; and a rolling stock vehicle valuation generator configured to: calculate, for a trip, a current valuation based at least in part on the weather data, the load data, the grade data, the damage data, the rate of depreciation data, trip mileage data, and trip time data; calculate, for the taxing jurisdiction, a taxing jurisdiction exiting valuation based at least in part on the weather data, the load data, the grade data, the damage data, the rate of depreciation, taxing jurisdiction mileage data, taxing jurisdiction time data, and the taxing jurisdiction information; and provide the current valuation and the taxing jurisdiction exiting valuation to a BMA, wherein the current valuation and the taxing jurisdiction exiting valuation are used to determine a tax amount owed during a tax period.

In general, in one aspect, embodiments of the invention relate to a non-transitory computer readable medium comprising instructions that, when executed by a computer processor, perform a method comprising: obtaining weather data from a weather data source, load data from a load data source, grade data from a grade data source, and damage data from a damage data source; performing a determination of a rate of depreciation for the rolling stock vehicle; calculating, for a trip, a current valuation based at least in part on the weather data, the load data, the grade data, the damage data, the rate of depreciation, trip mileage data, and trip time data; and upon exiting a taxing jurisdiction: calculating, for a taxing jurisdiction across a network in real-time, a taxing jurisdiction exiting valuation for the taxing jurisdiction based at least in part on the weather data, the load data, the grade data, the damage data, the rate of depreciation, taxing jurisdiction mileage data, taxing jurisdiction time data, and taxing jurisdiction mapping data; and providing the current valuation and the taxing jurisdiction exiting valuation to a BMA, where the current valuation and the taxing jurisdiction exiting valuation are used to determine a tax amount owed during a tax period.

Other aspects of the invention will be apparent from the following description and the appended claims.

BRIEF DESCRIPTION OF DRAWINGS

FIG. 4.1 and FIG. 4.2 show computing systems in accordance with one or more embodiments of the invention

DETAILED DESCRIPTION

Figure 1:
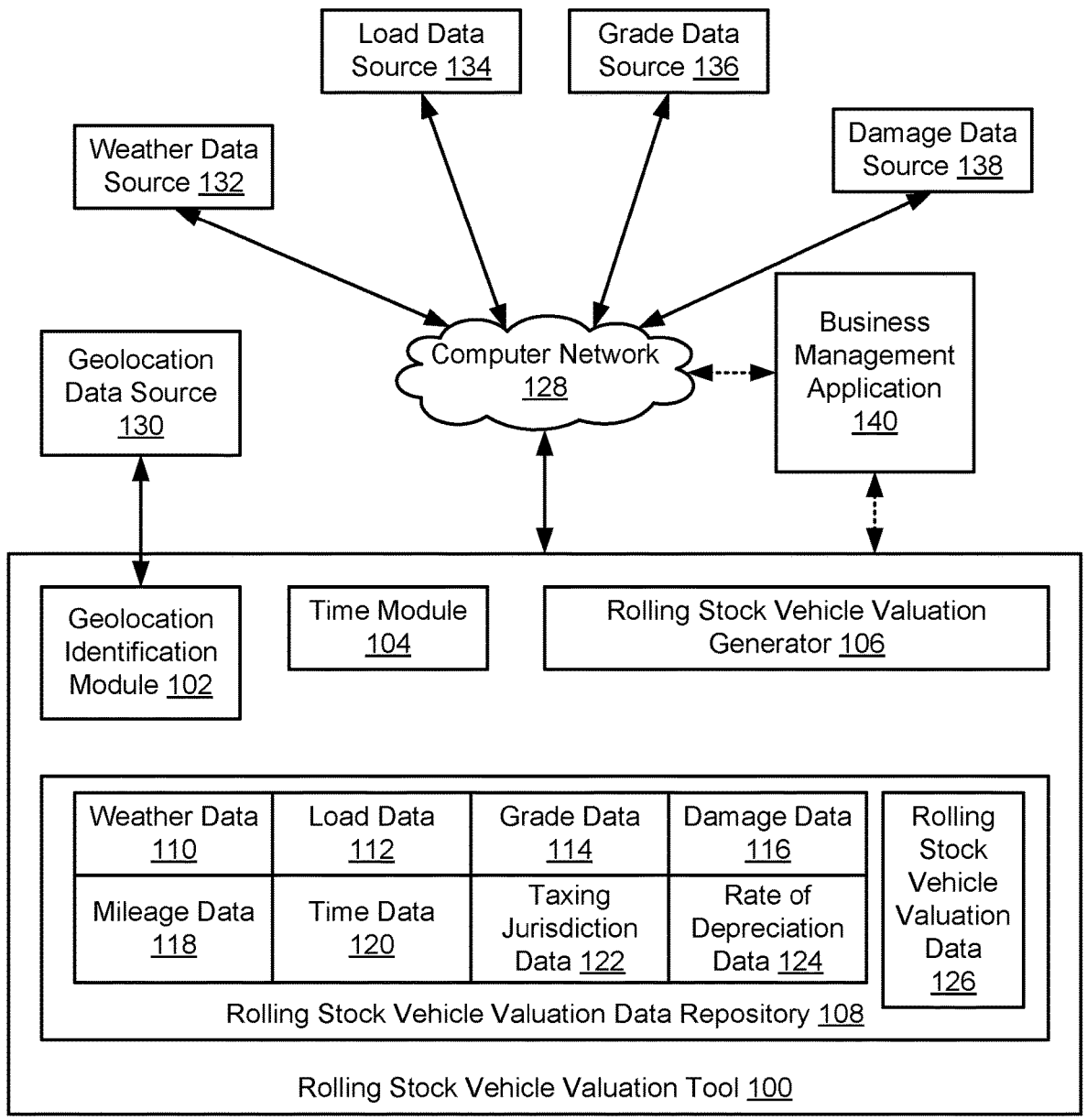
FIG. 1 shows a system in accordance with one or more embodiments of the invention.

Specific embodiments of the invention will now be described in detail with reference to the accompanying figures. Like elements in the various figures may be denoted by like reference numerals and/or like names for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method, system, and non-transitory computer readable medium for determining a real-time valuation of multi-wheeled vehicles also known as rolling stock. Specifically, in one or more embodiments of the invention, data is obtained from a variety of sources and used in one or more valuation equations to produce one or more valuations. More specifically, weather data, load data, grade data, damage data, rate of depreciation data, and GPS data may be obtained and used, along with time data, to determine a valuation of rolling stock. In one or more embodiments of the invention, a rolling stock vehicle valuation tool includes functionality to calculate a current valuation based on the aforementioned data types and a beginning valuation. The rolling stock vehicle valuation tool may also include functionality to determine the valuation of a rolling stock vehicle exiting a taxing jurisdiction using the aforementioned data and the valuation of the rolling stock vehicle when entering the taxing jurisdiction. In one or more embodiments of the invention, the valuations may be calculated for any relevant time period or taxing jurisdiction. Once calculated, the valuations may be provided to a business management application (BMA) for use in calculating taxes owed in the various jurisdictions at relevant times. In one or more embodiments, the valuations are provided indirectly (through the BMA) or directly with the various jurisdictions using communication in real time over a network, either wired or wireless. In one or more embodiments, the valuation used to calculate taxes owed in a jurisdiction is determined in real time upon exiting one jurisdiction or entering another jurisdiction.

FIG. 1 shows a system in accordance with one or more embodiments of the invention. As shown in FIG. 1, the system includes a rolling stock vehicle valuation tool (100). The rolling stock vehicle valuation tool (100) may include a geolocation identification (or global positioning system (GPS)) module (102), a time module (104), a rolling stock vehicle valuation generator (106), and a rolling stock vehicle valuation data repository (108). The rolling stock vehicle valuation data repository (108) may include weather data (110), load data (112), grade data (114), damage data (116), mileage data (118), time data (120), taxing jurisdiction data (122), rate of depreciation data (124), and rolling stock vehicle valuation data (126). In one or more embodiments of the invention, the rolling stock vehicle valuation tool (100) is operatively connected to and/or includes a geolocation data source (130), a weather data source (132), a load data source (134), a grade data source (136), a damage data source (138), and a business management application (BMA) (140). One or more of the aforementioned components may be operatively connected to the rolling stock vehicle valuation tool (100) via a network (128). Each of these components is described below.

In one or more embodiments of the invention, a rolling stock vehicle valuation tool (100) includes all or a portion of a computing device, which includes hardware, software, firmware, circuitry, and/or any combination thereof. In one or more embodiments of the invention, a computing device is any device or any set of devices capable of electronically processing instructions and that includes at least the minimum processing power, memory, input and output device(s), and network connectivity in order to contribute to the performance of at least some portion of the functions described in accordance with one or more embodiments of the invention. Examples of computing devices include, but are not limited to, a server (e.g., a blade-server in a blade-server chassis), a virtual machine (VM), a desktop computer, a mobile device (e.g., laptop computer, smart phone, personal digital assistant, tablet computer, and/or any other mobile computing device), and/or any other type of computing device with the aforementioned minimum requirements.

In one or more embodiments of the invention, the rolling stock vehicle valuation tool (100) is a mobile device, or a portion thereof, in the possession of a user (e.g., a smart phone of a truck driver, a computing device included in a rolling stock vehicle, etc.), and capable of determining valuations of a rolling stock vehicle. In other embodiments of the invention, the rolling stock vehicle valuation tool (100) executes on two or more computing devices. In such embodiments, the computing devices may be connected via a network (e.g., computer network (128)). For example, a mobile computing device of a user may act as a client device that gathers a portion of the data types (e.g., mileage, location, time, etc.) for calculating valuation, and provides that data, via a network, to a computing device acting as a server that gathers additional information (e.g., weather data) and performs valuation calculations.

In one or more embodiments of the invention, the rolling stock vehicle valuation tool (100) is operatively connected to one or more other components via a computer network (128). In one or more embodiments of the invention, a computer network (128) is a collection of one or more network devices (not shown) that facilitates network connectivity for one or more operatively connected devices (e.g., rolling stock vehicle valuation tool (100), weather data source (132), etc.). In one or more embodiments of the invention, the computer network (128) may be all or a portion of a network. A computer network may include a datacenter network, a wide area network, a local area network, a wireless network, a cellular phone network, or any other suitable network that facilitates the exchange of information from one part of the network to another. In one or more embodiments, the computer network (128) may be coupled with or overlap with the Internet.

In one or more embodiments, the rolling stock vehicle valuation tool (100) includes a rolling stock vehicle valuation data repository (108). In one or more embodiments of the invention, a data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

In one or more embodiments of the invention, the rolling stock vehicle valuation tool (100) includes and/or is operatively connected to a geolocation identification module (102). In one or more embodiments of the invention, a geolocation identification module (102) is any hardware (e.g., circuitry), software, firmware, and/or any combination thereof that includes functionality to obtain, process, and/or store GPS or geolocation data. A geolocation identification module (102) may execute on a computing device.

In one or more embodiments of the invention, the geolocation identification module (102) includes functionality to obtain geolocation (e.g. GPS) data (not shown). In one or more embodiments of the invention, geolocation data refers to any data that may be used for determining a location/position. geolocation data may include, but is not limited to, information such as coordinates obtained or calculated by the geolocation identification module (102), distance information from landmarks (e.g., cellular towers), signal strength, and timestamp information. Geolocation data may be used as part of a determination of a variety of other data types. For example, geolocation data over time may be used to determine mileage data (118) by using the position information to determine how many miles a rolling stock vehicle has traveled (i.e., mileage data (118)).

In one or more embodiments of the invention, mileage data (118) is stored in the rolling stock vehicle valuation data repository (108). In one or more embodiments of the invention, mileage data (118) may be used to determine a mileage coefficient, which may be stored with the mileage data (118). A mileage coefficient may be calculated based on a number of miles traveled and an average mileage per time value. In one or more embodiments of the invention, the average mileage per time value may be obtained from an entity that keeps rolling stock statistics (not shown). For example, the average mileage per time value for a certain class of truck may be obtained via the computer network (128) from the Federal Highway Administration.

In one or more embodiments of the invention, geolocation data, or a portion thereof, is obtained from a geolocation data source (130). In one or more embodiments of the invention, the geolocation data source (130) is operatively connected to the geolocation identification (102). The geolocation data source (130) may be one or more GPS satellites, a location data provider providing data over a computer network (128), a cellular tower, and/or any other geolocation or GPS data source capable of providing information related to the location of the geolocation identification module (102). The geolocation identification module (102) may include functionality to determine position/location using the GPS data received from the geolocation data source (130). Such a determination may include any amount of processing or calculation. For example, geolocation data may be obtained from three GPS satellites and include the location of the satellites and a timestamp. The geolocation identification module (102) may then perform a trilateration calculation and/or perform other processing steps to determine a longitude and latitude corresponding to the position of the geolocation identification module (102). As another example, when the geolocation identification module (102) is executing on a mobile device, such as a mobile phone, the geolocation or GPS data may additionally include data obtained over a wireless network and/or from one or more cellular towers, and such additional information may be used when determining position.

In one or more embodiments of the invention, the rolling stock vehicle valuation tool (100) includes and/or is operatively connected to a time module (104). In one or more embodiments of the invention, a time module (104) is any hardware (e.g., circuitry), software, firmware, and/or any combination thereof that includes functionality to obtain, process, and/or store time data. A time module (104) may execute on a computing device.

In one or more embodiments of the invention, the time module (104) includes functionality to obtain and/or generate time data (120). In one or more embodiments of the invention, time data (120) refers to any data related to time or that may be used for determining a time. Such data may be stored in the rolling stock vehicle valuation data repository (108), and may include, but is not limited to, information such as time information included in and/or derived from geolocation or GPS data, information related to time received via a network, information related to time obtained locally from the device on which the time module executes, and/or any other source of time data. Time data (120) may be stored in any unit of time (e.g., minutes, hours, days, etc.) and a given time value may be stored as one or more unit types. In one or more embodiments of the invention, though not shown in FIG. 1, the rolling stock vehicle valuation tool (100) includes one or more clock devices for keeping time, and the time module (104) may include functionality to obtain time data (120) from the one or more clock devices.

In one or more embodiments of the invention, the rolling stock vehicle valuation data repository (108) includes functionality to store weather data (110). In one or more embodiments of the invention, weather data (110) is any data that relates to weather that has occurred in an area while the rolling stock vehicle was in the area. Weather data (110) may include information indicating that the weather was fair, that precipitation (e.g., snow, rain, hail, etc.) occurred, that heavy wind occurred, temperature data, data related to particulate matter in the air (e.g., air quality data), any other information related to weather, and/or any combination thereof. Weather data (110) may also include time data indicating the time at which the weather occurred, and/or be associated (e.g., linked) to relevant time data in the data repository (e.g., as part of a relational database). In one or more embodiments of the invention, Weather data (110) may also be associated with geolocation or GPS data obtained and/or determined by the geolocation identification module (102) to determine the location at which a given weather condition existed.

In one or more embodiments of the invention, the weather data (110) is obtained by the rolling stock vehicle valuation tool (100) from a weather data source (132). In one or more embodiments of the invention, a weather data source (132) is any public or private data source that provides information related to weather. For example, the weather data source (132) may be a national weather service. As another example, the weather data source (132) may be a private data source such as The Weather Channel®, Weather Underground®, or AccuWeather®.

In one or more embodiments of the invention, the rolling stock vehicle valuation data repository (108) includes functionality to store load data (112). In one or more embodiments of the invention, load data (112) is any data that relates to the load carried by a rolling stock vehicle. Load data (112) may include information indicating that the rolling stock vehicle is empty, the total load weight carried by the rolling stock vehicle, the load on a given axle of the rolling stock vehicle, any other data related to the load on the rolling stock vehicle, and/or any combination thereof. Load data (112) may also include time data indicating the time during which the load occurred, and/or be associated (e.g., linked) to relevant time data in the data repository (e.g., as part of a relational database). In one or more embodiments of the invention, load data (112) may also be associated with geolocation or GPS data obtained from and/or determined by the geolocation identification module (102) to determine the location at which a given load was present on a rolling stock vehicle.

In one or more embodiments of the invention, the load data (112) is obtained by the rolling stock vehicle valuation tool (100) from a load data source (134). In one or more embodiments of the invention, a load data source (134) is any public or private data source that provides load data (112). For example, the load data source (134) may be a weigh station that transmits load data to the rolling stock vehicle valuation tool (100) using a network or a wireless transmission protocol (e.g., Bluetooth). As another example, the load data source (134) may be a private data source such as one or more onboard scales with transponders for communicating the load data (112) to the rolling stock vehicle valuation tool (100).

In one or more embodiments of the invention, the rolling stock vehicle valuation data repository (108) includes functionality to store grade data (114). In one or more embodiments of the invention, grade data (114) is any data that relates to the grade of the path (e.g., road) traveled by a rolling stock vehicle. As used herein, the term 'grade' refers to the amount of incline or decline of a path relative to horizontal. Grade data (114) may include information indicating that the rolling stock vehicle has traveled a flat path or any value indicating and/or related to an angle of the path (e.g., 5% decline grade, 10.8% incline grade, etc.). Grade data (114) may also include time data indicating the time during which the grade occurred, and/or be associated (e.g., linked) to relevant time data in the data repository (e.g., as part of a relational database). In one or more embodiments of the invention, grade data may also be associated with geolocation or GPS data obtained from and/or determined by the geolocation identificationmodule (102) to determine the location at which a given grade existed.

In one or more embodiments of the invention, the grade data (114) is derived using geolocation or GPS data. For example, GPS data obtained from four GPS satellites may be used to determine grade data (114). In such embodiments, though not shown in FIG. 1, the grade data source (136) may be part of the rolling stock vehicle valuation tool (100) rather than operatively connected to the rolling stock valuation tool via a computer network (128). In one or more embodiments of the invention, the grade data (114) is obtained by the rolling stock vehicle valuation tool from a grade data source (136). In one or more embodiments of the invention, a grade data source (136) is any public or private data source that provides grade data. For example, the grade data source (136) may be an online resource that includes grade data for U.S. highways.

In one or more embodiments of the invention, the rolling stock vehicle valuation data repository (108) includes functionality to store damage data (116). In one or more embodiments of the invention, damage data (116) is any data that relates to damage to a rolling stock vehicle. Damage data (116) may include information related to the condition of a rolling stock vehicle. For example, damage data may indicate that the rolling stock vehicle is in new condition, excellent condition, very good condition, good condition, fair condition, poor condition, a non-operational condition, etc. Damage data (116) may also include time data indicating the time during which the damage condition existed, and/or be associated (e.g., linked) to relevant time data in the data repository (e.g., as part of a relational database). In one or more embodiments of the invention, damage data may also be associated with geolocation or GPS data obtained from and/or determined by the geolocation module (102) to determine the location(s) at which the damage condition existed.

In one or more embodiments of the invention, the damage data (116) is obtained from a user of the rolling stock vehicle valuation tool (100). In such embodiments, though not shown in FIG. 1, the damage data (116) may be directly entered into the rolling stock vehicle valuation tool (100) by the user rather than an external damage data source (138) being operatively connected to the rolling stock valuation tool via a network (128). In such an embodiment, the user may be considered a damage data source. In one or more embodiments of the invention, the damage data (116) is obtained by the rolling stock vehicle valuation tool (100) from a damage data source (138). In one or more embodiments of the invention, a damage data source (138) is any public or private data source that provides damage data. For example, an operator of a rolling stock vehicle may submit photographs of the vehicle to an online resource that returns damage data by providing a damage condition assessment based on the photographs.

In one or more embodiments of the invention, the rolling stock vehicle valuation data repository (108) includes functionality to store taxing jurisdiction data (122). In one or more embodiments of the invention, taxing jurisdiction data (122) is any data relating to the boundaries of a taxing jurisdiction, such as states, counties, municipalities, or any other jurisdiction in which an entity is capable of taxing a rolling stock vehicle. For example, taxing jurisdiction may include the location of the boundaries of the states of Texas, Oklahoma, and Arkansas (i.e., three separate taxing jurisdictions). Taxing jurisdiction data (122) may be associated with position data derived from geolocation or GPS data and/or with time data (120). In one or more embodiments of the invention, taxing jurisdiction data (122) is obtained from any source of such data. For example, taxing jurisdiction data may be obtained over the network from an online entity (not shown) that provides mapping information related to taxing jurisdictions.

In one or more embodiments of the invention, the rolling stock vehicle valuation data repository (108) includes functionality to store rate of depreciation data (124). In one or more embodiments of the invention, rate of depreciation data (124) is any data related to a rate of depreciation of a rolling stock vehicle. For example, the rate of depreciation data (124) may be a straight line depreciation and use the purchase price, salvage value, and asset life of a rolling stock vehicle to determine a depreciation rate. Rate of depreciation data (124) may be determined using any depreciation method, such as double declining depreciation or a combination of double declining and straight line depreciation.

In one or more embodiments of the invention, the rolling stock vehicle valuation data repository (108) includes functionality to store rolling stock vehicle valuation data (126). In one or more embodiments of the invention, rolling stock vehicle valuation data (126) is any data related to the value of a rolling stock vehicle. In one or more embodiments of the invention, rolling stock vehicle valuation data includes, but is not limited to, the purchase price of the rolling stock vehicle, the salvage value of a rolling stock vehicle, and/or any number of valuations calculated by a rolling stock vehicle valuation generator (106). For example, at a certain time, the current valuation of a rolling stock vehicle may be calculated and stored as $127,089. As another example, the value of the rolling stock vehicle may be calculated as $89,027 when exiting a given taxing jurisdiction.

In one or more embodiments of the invention, the rolling stock vehicle valuation tool (100) includes a rolling stock vehicle valuation generator (106). In one or more embodiments of the invention, the rolling stock vehicle valuation generator (106) is any hardware (e.g., circuitry), software, firmware, and/or any combination thereof that includes functionality to obtain, process, generate, and/or store rolling stock vehicle valuation data (126). In one or more embodiments of the invention, the rolling stock vehicle valuation generator (106) is operatively connected to the rolling stock vehicle valuation data repository (108). A rolling stock vehicle valuation generator (106) may execute on a computing device. In one or more embodiments of the invention, the rolling stock vehicle valuation generator (106) includes functionality to use various data types and valuations to execute one or more algorithms to determine the value of a rolling stock vehicle. The generation of rolling stock vehicle valuations is discussed further in the descriptions of FIG. 2 and FIG. 3, below.

In one or more embodiments of the invention, the rolling stock vehicle valuation tool (100) includes and/or is operatively connected to a BMA (140). In one or more embodiments of the invention, a BMA (140) executes on one or more computing devices. For example, the BMA (140) may execute, wholly or in part, on a mobile computing device on which the rolling stock vehicle valuation tool (100) executes. In one or more embodiments of the invention, a BMA (140) is any software for managing various aspects of the business in which a user is engaged.

In one or more embodiments of the invention, the BMA (140) is obtained from a software provider and installed and executed on one or more computing devices of a user. In one or more embodiments of the invention, the BMA (140) is provided by an application service provider, such as a software as a service (SaaS) provider. For example, the BMA (140) may be operated by the application service provider and accessed by the user on a subscription basis.

The BMA (140) may include functionality to process and/or store data corresponding to the valuation of a rolling stock vehicle. In one or more embodiments of the invention, the BMA (140) may be an accounting application, a tax preparation application, a payroll application, a personnel application, any personal financial management application, any combination thereof, or any other application for managing an aspect of a business. In one or more embodiments of the invention, the BMA (140) includes tax software. In other embodiments of the invention, the BMA (140) is operatively connected to tax software and includes functionality to provide data to the tax application related to the valuation of a rolling stock vehicle obtained from the rolling stock vehicle valuation tool. In one or more embodiments of the invention, the BMA (140) includes functionality to calculate taxes owed related to a rolling stock vehicle and to provide the taxes owed to the tax software.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. Accordingly, embodiments of the invention should not be considered limited to the specific arrangements of modules and elements shown in FIG. 1.

Figure 2:
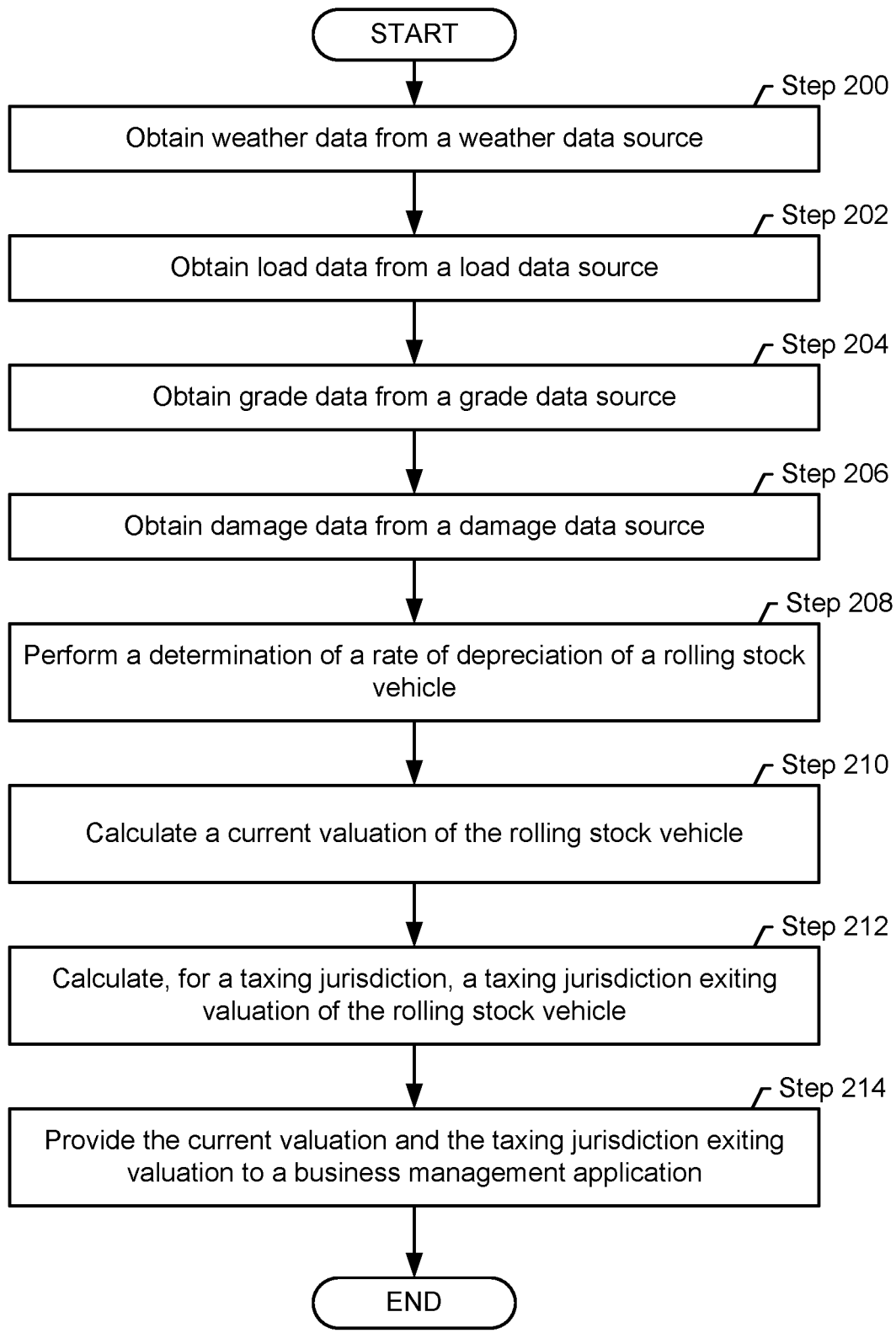
FIG. 2 shows a flowchart in accordance with one or more embodiments of the invention.

FIG. 2 shows a flowchart in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

FIG. 2 shows a flowchart describing a method for determining the value of a rolling stock vehicle. In Step 200, weather data is obtained from a weather data source. In one or more embodiments of the invention, weather data is obtained by a rolling stock vehicle valuation tool via a network. For example, the rolling stock vehicle valuation tool may access weather data via a network on a periodic or asynchronous basis and store such data in a rolling stock vehicle valuation data repository. Such weather data may be associated with the location and/or time at which the weather occurred. The rolling stock vehicle valuation tool may include functionality to process obtained weather data in order to calculate a weather coefficient based on the weather data. For example, weather data may be processed to determine that, for a given time and/or location, the weather was of one or more certain categories of weather (e.g., fair, raining, snowing, etc.). In such an example, once the weather data has been processed to determine one or more categories, empirical data may be used to assign a value as a weather coefficient. In one or more embodiments of the invention, a weather coefficient may be a value between 1 and 2, which may be stored with the weather data in the rolling stock vehicle valuation data repository. In such embodiments, 1 may be the baseline value of the weather coefficient and may be the value assigned for the best category of weather.

In Step 202, load data is obtained from a load data source. Load data may be obtained by a rolling stock vehicle valuation tool via a network. For example, the rolling stock vehicle valuation tool may access load data over a wireless network each time the rolling stock vehicle is weighed at a weigh station and store such data in the rolling stock vehicle valuation data repository. In one or more embodiments of the invention, the load data is obtained by the rolling stock vehicle valuation tool from one or more devices located on the rolling stock vehicle and configured to measure the load on at least a portion of the rolling stock vehicle. Such load data may be associated with the location and/or time at which the load occurred. The rolling stock vehicle valuation tool may include functionality to process obtained load data in order to calculate a load coefficient based on the load data. For example, load data may be processed to determine that, for a given time and/or location, the load was of one or more certain categories of load (e.g., empty, less than 10,000 pounds, etc.) In such an example, once the load data has been processed, empirical data may be used to assign a value as a load coefficient. In one or more embodiments of the invention, a load coefficient may be a value between 1 and 2, which may be stored as load data in the rolling stock vehicle valuation data repository. In such embodiments, 1 may be the baseline value of the load coefficient and may be used for when the rolling stock vehicle is empty.

In Step 204, grade data is obtained from a grade data source. Grade data may be obtained by a rolling stock vehicle valuation tool via a network. For example, the rolling stock vehicle valuation tool may access grade data for U.S. roads and highways and store such data in the rolling stock vehicle valuation data repository. In one or more embodiments of the invention, the grade data is obtained by the rolling stock vehicle valuation tool using geological or GPS data obtained by the GPS module. Such grade data may be associated with the location and/or time at which the grade occurred. The rolling stock vehicle valuation tool may include functionality to process obtained grade data in order to calculate a grade coefficient based on the grade data. For example, grade data may be processed to determine that, for a given time and/or location, the grade of the road was of one or more certain categories of grade (e.g., flat, incline, steep incline, decline, steep decline etc.) In such an example, once the grade data has been processed, empirical data may be used to assign a value as a grade coefficient. In one or more embodiments of the invention, a grade coefficient may be a value between 1 and 2, which may be stored as grade data in the rolling stock vehicle valuation data repository. In such embodiments, 1 may be the baseline value of the grade coefficient and may be used when the grade is flat.

In Step 206, damage data is obtained from a damage data source. Damage data may be obtained by a rolling stock vehicle valuation tool via a network. For example, the rolling stock vehicle valuation tool may provide information (e.g., photos, history, etc.) to an online damage calculation resource and receive in return damage data related to the rolling stock vehicle. Such data may be stored in the rolling stock vehicle valuation data repository. In one or more embodiments of the invention, the damage data is obtained by the rolling stock vehicle valuation tool from a user who enters the damage data. Such damage data may be associated with the location and/or time during which the damage is present. The rolling stock vehicle valuation tool may include functionality to process obtained damage data in order to calculate a damage coefficient based on the damage data. For example, damage data may be processed to determine that, for a given time and/or location, the damage was of one or more certain categories of damage. Such categories may include, but are not limited to, new/excellent condition, very good condition, good condition, fair condition, poor condition, not running, and totaled. In such an example, once the damage data has been processed, empirical data may be used to assign a value as a damage coefficient. In one or more embodiments of the invention, a damage coefficient may be a value or 1 or more, which may be stored as damage data in the rolling stock vehicle valuation data repository. In such embodiments, 1 may be the baseline value of the damage coefficient and may be used when the rolling stock vehicle is in new or excellent condition. In one or more embodiments of the invention, the damage coefficient may be high enough to cause the valuation of the rolling stock vehicle to be very low (e.g., after the rolling stock vehicle has been in a catastrophic accident).

In Step 208, a determination is made of a rate of depreciation of a rolling stock vehicle. A rate of depreciation may be determined using any depreciation method, such as straight line, double depreciating, or any combination thereof. For example, a rolling stock vehicle may use a ten-year straight line depreciation based on the fact that the rolling stock vehicle has an estimated 10 years of asset life left, and the rate of depreciation may be the salvage value subtracted from the asset purchase value, which the result being divided by the asset life in an appropriate unit of time (e.g., years, months, days, etc.). In one or more embodiments of the invention, once a rate of depreciation is determined, the rate of depreciation may be stored as rate of depreciation data in the rolling stock vehicle valuation data repository.

In Step 210, one or more current valuations are calculated for a rolling stock vehicle. As used herein, a current valuation refers to any valuation of a rolling stock vehicle at a specific time. For example, a current valuation may be the valuation of a rolling stock vehicle on July 4, or a valuation of a rolling stock vehicle on whatever day the rolling stock vehicle crossed a 100,000 miles traveled threshold. Any number of current valuations may be calculated, and may be calculated at any regular or non-regular interval. In one or more embodiments of the invention, a current valuation may be calculated by the rolling stock vehicle valuation generator of the rolling stock vehicle valuation tool. In one or more embodiments of the invention, the current valuation may be a valuation at any point in time or after any number of miles have been traveled. For example, a current valuation may be calculated at the end of a trip and/or on a regular basis (e.g., daily, monthly, quarterly, etc.).

In one or more embodiments of the invention, the current valuation is calculated using a current valuation algorithm. In one or more embodiments of the invention, the current valuation algorithm uses a weather coefficient derived from weather data, a load coefficient derived from load data, a grade coefficient derived using grade data, a damage coefficient derived using damage data, a mileage coefficient derived from mileage data, a rate of depreciation, time data, and a beginning valuation. In one or more embodiments of the invention, the current valuation equation is as follows:

$$Vc = Vb - \left(\left(\frac{W+L+G+D+Z}{5}\right) * (R) * (Tc - Tb)\right)$$

The variables in the above equation are as follows:
Vc=Current Valuation
Vb=Beginning Valuation
W=Weather Coefficient
L=Load Coefficient
G=Grade Coefficient
D=Damage Coefficient
Z=Mileage Coefficient
R=Rate of Depreciation
Tc=Current Time
Tb=Beginning Time In one or more embodiments of the invention, once each of the coefficients has been determined from relevant data and the rate of depreciation has been determined, then a time period for which a valuation is desired may be selected. For example, a valuation may be desired for the month of June on the last day of the month. Therefore, Tc is June 30, and Tb is June 1, making Tc−Tb 29 days. Once a time period is selected, a valuation on of the rolling stock at the beginning of the time period must be determined. For example, if the rolling stock vehicle was purchased on June 1, then the purchase price may be used as Vb. In one or more embodiments of the invention, the beginning valuation Vb may be the result of a previous current valuation equation execution. For example, a current valuation of the rolling stock vehicle at the end of May can be used as the beginning valuation for the month of June. In one or more embodiments of the invention, the current valuation algorithm may be integrated for substantially continuous evaluation.

In Step 212, a taxing jurisdiction exiting valuation is calculated for a rolling stock vehicle. As used herein, a taxing jurisdiction exiting valuation refers to a valuation of a rolling stock vehicle when exiting a certain taxing jurisdiction. For example, a taxing jurisdiction exiting valuation may be the valuation of a rolling stock vehicle when the rolling stock vehicle exits the state of Texas. In one or more embodiments of the invention, a taxing jurisdiction exiting valuation may be calculated by the rolling stock vehicle valuation generator of the rolling stock vehicle valuation tool. In one or more embodiments of the invention, the taxing jurisdiction exiting valuation may be calculated/determined any time that a rolling stock vehicle exits a taxing jurisdiction. For example, a taxing jurisdiction exiting valuation may be calculated during a trip each time the rolling stock vehicle crosses state lines. Any number of taxing jurisdiction exiting valuations may be calculated, and they may be calculated and any regular or non-regular interval.

In one or more embodiments of the invention, the taxing jurisdiction exiting valuation is calculated using a taxing jurisdiction exiting valuation algorithm. In one or more embodiments of the invention, the taxing jurisdiction exiting valuation algorithm uses a weather coefficient derived from weather data, a load coefficient derived from load data, a grade coefficient derived using grade data, a damage coefficient derived using damage data, a mileage coefficient derived using mileage data, a rate of depreciation, time data, and a taxing jurisdiction entering valuation. In one or more embodiments of the invention, the current valuation equation is as follows:

$$Vx = Ve - \left(\left(\frac{W + L + G + D + Z}{5}\right) * (R) * (Tx - Te)\right)$$

The variables in the above equation are as follows:
Vx=Taxing Jurisdiction Exiting Valuation
Ve=Taxing Jurisdiction Entering Valuation
W=Weather Coefficient
L=Load Coefficient
G=Grade Coefficient
D=Damage Coefficient
Z=Mileage Coefficient
R=Rate of Depreciation
Tx=Taxing Jurisdiction Exiting Time
Te=Taxing Jurisdiction Entering Time In one or more embodiments of the invention, once each of the coefficients has been determined from relevant data, and the rate of depreciation has been determined, then a taxing jurisdiction for which a valuation is desired may be selected. For example, a valuation may be desired for the most recent time a rolling stock vehicle was traveling in Nebraska. The trip through Nebraska may have occurred between March 7 and March 29. Therefore, Te is June March 7, and Tx is March 29, making Tx−Te 22 days. Once a taxing jurisdiction is selected, a valuation on of the rolling stock vehicle when entering the taxing jurisdiction must be determined. For example, if the rolling stock vehicle was purchased on March 7 (i.e., the day the rolling stock vehicle entered Nebraska), then the purchase price may be used as Ve. In one or more embodiments of the invention, the beginning valuation Ve may be the result of a previous taxing jurisdiction valuation equation execution. For example, a taxing jurisdiction exiting valuation of the rolling stock vehicle when the rolling stock vehicle exited Kansas before entering Nebraska may be used as the taxing jurisdiction entering valuation for entering Nebraska. In one or more embodiments of the invention, the taxing jurisdiction exiting valuation algorithm may be integrated for substantially continuous evaluation.

In Step 214, one or more current valuations and/or one or more taxing jurisdiction exiting valuations are provided to a BMA. In one or more embodiments of the invention, the BMA executes, at least in part, on the same device as the rolling stock vehicle valuation tool, and the valuation data is passed to and/or made otherwise available to the BMA. In other embodiments of the invention, the valuation data is transmitted over a network to the BMA. In one or more embodiments of the invention, the BMA processes the valuation data in order to determine tax information for one or more taxing jurisdictions in a rolling stock vehicle has operated. In other embodiments, the BMA either provides, or performs some processing and then provides, the valuation data to a tax application that determines tax information for one or more taxing jurisdictions in which a rolling stock vehicle has operated.

Figure 3:
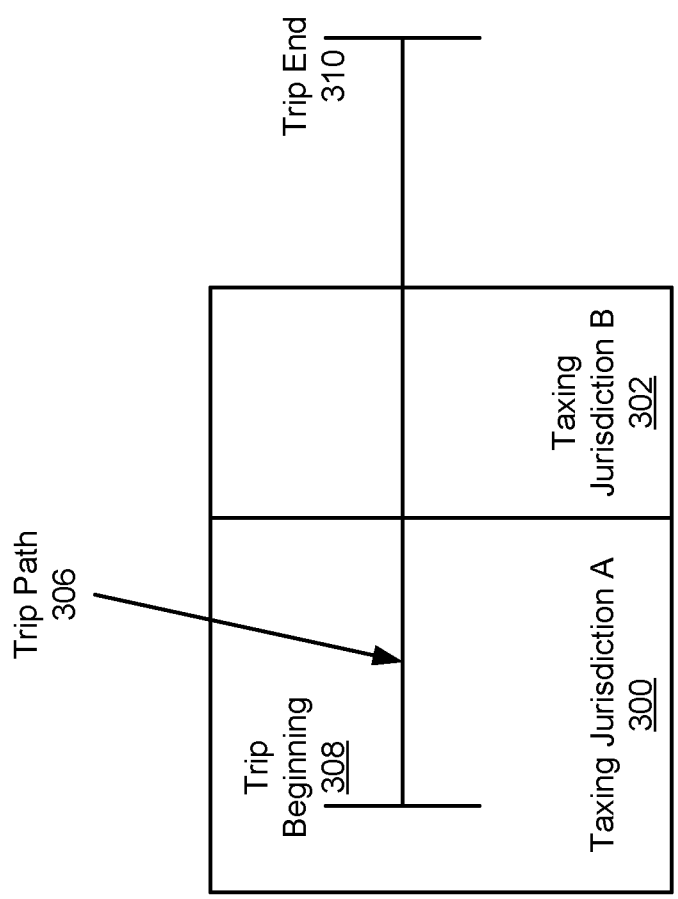
FIG. 3 shows an example in accordance with one or more embodiments of the invention.

FIG. 3 shows an example in accordance with one or more embodiments of the invention. The following example is for explanatory purposes only and not intended to limit the scope of the invention.

Referring to FIG. 3, consider a scenario in which a tractor-trailer (i.e., a rolling stock vehicle) is being driven on a trip by an operator to deliver goods. FIG. 3 shows the trip path (306), which includes a trip beginning (308) and a trip end (310). FIG. 3 also shows that, during the trip, the tractor-trailer travels in taxing jurisdiction A (300) and through taxing jurisdiction B (302) before continuing on to the conclusion of the trip. Both taxing jurisdictions require taxes to be paid on rolling stock vehicles that travel through the jurisdiction. Such taxes may be calculated, at least in part, using the valuation of the rolling stock vehicle during the time it was traveling in the jurisdiction.

In the present example, the tractor-trailer was purchased for $100,000 shortly before the trip and was not used until the trip began, making $100,000 the beginning valuation when the tractor-trailer begins the trip in taxing jurisdiction A. As the tractor-trailer is leaving jurisdiction A, the rolling stock vehicle valuation tool, which is executing on a mobile computing device of the operator, calculates the current valuation of the tractor-trailer using the current valuation algorithm discussed above in the description of FIG. 2:

$$Vc = Vb - \left(\left(\frac{W + L + G + D + Z}{5}\right) * (R) * (Tc - Tb)\right)$$

In the present example, Vb is $100,000. Because the weather was nearly perfect in taxing jurisdiction A, the weather coefficient W is determined to be 1 using weather data obtained from a weather data source. Because the tractor-trailer was fully loaded, the load coefficient L is determined to be 1.2 using load data obtained from a transponder in the trailer. Because the roads traveled were slightly hilly, the grade coefficient is determined to be 1.1 using GPS data obtained from the GPS module of the operator's mobile computing device. During the trip in taxing jurisdiction A, there was no damage to the tractor-trailer, so the damage coefficient D is at a baseline of 1. The mileage coefficient Z is calculated using the following equation:

$$Z = (Mc - Mb)/(\text{average mileage per unit time} * \text{time})$$

In the present example, Mb is 0, as the tractor-trailer was purchased new and had no miles on it yet. The current mileage Mc as the tractor-trailer leaves taxing jurisdiction A is 6000 miles. The average miles per time for tractor-trailers is obtained from the Federal Highway Administration and is 178.51 miles per day. The tractor-trailer traveled in taxing jurisdiction A from January 1 (i.e., Tb) to January 30 (i.e., Tc), making time 29 days (i.e., Tc−Tb). Therefore, Z=(6000−0)/(178.51*29)=(6000/5176.79)=1.159.

The rate of depreciation in the present example is calculated using a straight line depreciation method. Therefore:

$$R = (\text{Asset Purchase Price} - \text{Salvage Value})/(\text{Asset life})$$

The salvage value of the tractor-trailer $20,000. The asset life of the tractor-trailer is 5 years, which is 1825 days. Accordingly, R=($100,000−$20,000)/1825=$43.84 per day Once all of the aforementioned details have been determined, the rolling stock vehicle valuation tool may calculate the current valuation of the tractor-trailer at the time it is leaving taxing jurisdiction A. Specifically:

$Vc=\$100,000-((1+1.2+1.1+1+1.159)/5)*(43.84 \text{ per day})*(29 \text{ days})$ Vc=$98.611.93

Vc may be provided to a BMA for use in determining, at least in part, the amount of taxes owed in taxing jurisdiction A.

The value Vc, calculated in real time as the tractor-trailer leaves taxing jurisdiction A, may be used as the taxing jurisdiction entering valuation Ve as the tractor-trailer enters taxing jurisdiction B. Ve may be used for calculating the taxing jurisdiction exiting valuation in real time as the truck leaves taxing jurisdiction B using the taxing jurisdiction exiting algorithm described above. The taxing jurisdiction exiting valuation of the tractor-trailer may also be provided to the BMA for use in determining the taxes owed on the tractor-trailer in taxing jurisdiction B.

Embodiments of the invention may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform all or a portion of one or more embodiments of the invention.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4.1, while performing one or more embodiments of the invention, may perform data comparison. Data comparison may be used to compare two or more data values (e.g., A, B). For example, one or more embodiments may determine whether $A>B$, $A=B$, $A !=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4.1 and the nodes and/or client device in FIG. 4.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a real-time valuation of a rolling stock vehicle, comprising:

obtaining weather data from a weather data source, load data from a load data source, grade data from a grade data source, and damage data from a damage data source;

performing a determination of a rate of depreciation for the rolling stock vehicle;

calculating, for a trip, a current valuation of the rolling stock vehicle based at least in part on the weather data, the load data, the grade data, the damage data, the rate of depreciation, trip mileage data, and trip time data, wherein calculating comprises:

for an interval of a plurality of intervals, calculating an interval current valuation by:

obtaining an interval beginning valuation of the rolling stock vehicle;

determining an interval weather coefficient using interval geolocation data and interval weather data of the weather data;

determining an interval load coefficient using the interval geolocation data and interval load data of the load data;

determining an interval grade coefficient using the interval geolocation data;

determining an interval damage coefficient using interval damage data of the damage data;

determining an interval rate of depreciation; and calculating the interval current valuation using a current valuation algorithm, the interval beginning valuation, the interval weather coefficient, the interval load coefficient, the interval grade coefficient, the interval damage coefficient, the interval rate of depreciation, an interval mileage difference of the trip mileage data, and an interval time difference of the trip time data;

upon exiting a taxing jurisdiction:

calculating, across a network in real-time, a taxing jurisdiction exiting valuation of the rolling stock vehicle for the taxing jurisdiction based at least in part on the weather data, the load data, the grade data, the damage data, the rate of depreciation, taxing jurisdiction mileage data, taxing jurisdiction time data, and taxing jurisdiction mapping data, wherein the current valuation and the taxing jurisdiction exiting valuation are used to determine a tax amount owed during a tax period; and presenting one or more of the current valuation, the taxing jurisdiction exiting valuation, and the tax amount owed, wherein the one or more of the current valuation, the taxing jurisdiction exiting valuation, and the tax amount owed are displayed on a graphical user interface (GUI) of a user device.

2. The method of claim 1, wherein the weather data is obtained from a private weather data source.

3. The method of claim 1, wherein the interval is one selected from a group consisting of a standard mileage interval and a standard time interval.

4. The method of claim 1, wherein calculating the taxing jurisdiction exiting valuation comprises:
for the interval of the plurality of intervals, calculating an interval taxing jurisdiction exiting valuation by:
obtaining an interval taxing jurisdiction entering valuation of the rolling stock vehicle;
determining the interval grade coefficient further using the interval grade data of the grade data; and
calculating the interval taxing jurisdiction exiting valuation using a taxing jurisdiction exiting valuation algorithm, the interval jurisdiction entering valuation, the interval weather coefficient, the interval load coefficient, the interval grade coefficient, the interval damage coefficient, the interval rate of depreciation, the interval mileage difference of the taxing jurisdiction mileage data, and the interval time difference of the taxing jurisdiction time data.

5. The method of claim 4, wherein the load data is obtained from a transponder located on the rolling stock vehicle and configured to determine a load on the rolling stock vehicle.

6. The method of claim 4, wherein the interval is one selected from a group consisting of a standard mileage interval and a standard time interval.

7. A system comprising:
a rolling stock vehicle valuation tool operatively connected to a weather data source, a load data source, a grade data source, and a damage data source, the rolling stock vehicle valuation tool comprising:
a processor and a memory;
a geolocation identification module operatively connected to a geolocation data source and configured to obtain geolocation data corresponding to a rolling stock vehicle;
a time module configured to provide time data corresponding to the rolling stock vehicle;
a rolling stock vehicle valuation data repository comprising weather data obtained from the weather data source, load data obtained from the load data source, grade data obtained from the grade data source, damage data obtained from the damage data source, mileage data obtained from the geolocation identification module, time data obtained from the time module, taxing jurisdiction data, rate of depreciation data, and rolling stock vehicle valuation data;
a network configured to communicate with a taxing jurisdiction in real-time; and
a rolling stock vehicle valuation generator configured to:
calculate, for a trip, a current valuation of the rolling stock vehicle based at least in part on the weather data, the load data, the grade data, the damage data, the rate of depreciation data, trip mileage data, and trip time data, wherein the rolling stock vehicle valuation generator is configured to calculate the current valuation by:
for an interval of a plurality of intervals, calculate an interval current valuation by:
obtain an interval beginning valuation of the rolling stock vehicle;
determine an interval weather coefficient using interval geolocation data and interval weather data of the weather data;
determine an interval load coefficient using the interval geolocation data and interval load data of the load data;
determine an interval grade coefficient using the interval geolocation data;
determine an interval damage coefficient using interval damage data of the damage data;
determine an interval rate of depreciation; and
calculate the interval current valuation using a current valuation algorithm, the interval beginning valuation, the interval weather coefficient, the interval load coefficient, the interval grade coefficient, the interval damage coefficient, the interval rate of depreciation, an interval mileage difference of the trip mileage data, and an interval time difference of the trip time data;
calculate, for the taxing jurisdiction, a taxing jurisdiction exiting valuation of the rolling stock vehicle based at least in part on the weather data, the load data, the grade data, the damage data, the rate of depreciation, taxing jurisdiction mileage data, taxing jurisdiction time data, and the taxing jurisdiction information; and
provide the current valuation and the taxing jurisdiction exiting valuation to a business management application (BMA),
wherein the current valuation and the taxing jurisdiction exiting valuation are used to determine a tax amount owed during a tax period,
present one or more of the current valuation, the taxing jurisdiction exiting valuation, and the tax amount owed, wherein the one or more of the current valuation, the taxing jurisdiction exiting valuation, and the tax amount owed are displayed on a graphical user interface (GUI) of a user device.

8. The system of claim 7, wherein the network is configured to wirelessly communicate with the taxing jurisdiction.

9. The system of claim 7, wherein the rolling stock vehicle valuation tool comprises a mobile computing device.

10. The system of claim 7, wherein the rolling stock vehicle valuation tool is operatively connected to the weather data source, the load data source, the grade data source, and the damage data source by the network.

11. The system of claim 7, wherein BMA executes on the processor of the rolling stock vehicle valuation tool.

12. The system of claim 7, wherein the geolocation data source and the grade data source are the same data source.

13. The system of claim 7, wherein the load data is obtained from a transponder located on the rolling stock vehicle and configured to determine a load on the rolling stock vehicle.

14. A non-transitory computer readable medium comprising instructions that, when executed by a computer processor, perform a method comprising:
obtaining weather data from a weather data source, load data from a load data source, grade data from a grade data source, and damage data from a damage data source;
performing a determination of a rate of depreciation for the rolling stock vehicle;

calculating, for a trip, a current valuation of the rolling stock vehicle based at least in part on the weather data, the load data, the grade data, the damage data, the rate of depreciation, trip mileage data, and trip time data, wherein calculating comprises:
for an interval of a plurality of intervals, calculating an interval current valuation by:
obtaining an interval beginning valuation of the rolling stock vehicle;
determining an interval weather coefficient using interval geolocation data and interval weather data of the weather data;
determining an interval load coefficient using the interval geolocation data and interval load data of the load data;
determining an interval grade coefficient using the interval geolocation data;
determining an interval damage coefficient using interval damage data of the damage data;
determining an interval rate of depreciation; and
calculating the interval current valuation using a current valuation algorithm, the interval beginning valuation, the interval weather coefficient, the interval load coefficient, the interval grade coefficient, the interval damage coefficient, the interval rate of depreciation, an interval mileage difference of the trip mileage data, and an interval time difference of the trip time data;
upon exiting a taxing jurisdiction:
calculating, for a taxing jurisdiction across a network in real-time, a taxing jurisdiction exiting valuation of the rolling stock vehicle for the taxing jurisdiction based at least in part on the weather data, the load data, the grade data, the damage data, the rate of depreciation, taxing jurisdiction mileage data, taxing jurisdiction time data, and taxing jurisdiction mapping data; and
providing the current valuation and the taxing jurisdiction exiting valuation to a business management application (BMA),
wherein the current valuation and the taxing jurisdiction exiting valuation are used to determine a tax amount owed during a tax period; and
presenting one or more of the current valuation, the taxing jurisdiction exiting valuation, and the tax amount owed, wherein the one or more of the current valuation, the taxing jurisdiction exiting valuation, and the tax amount owed are displayed on a graphical user interface (GUI) of a user device.

15. The non-transitory computer readable medium of claim 14, wherein the weather data is obtained from a private weather data source.

16. The non-transitory computer readable medium of claim 14, wherein the interval is one selected from a group consisting of a standard mileage interval and a standard time interval.

17. The non-transitory computer readable medium of claim 14, further comprising instructions for:
for the interval of the plurality of intervals, calculating an interval taxing jurisdiction exiting valuation by:
obtaining an interval taxing jurisdiction entering valuation of the rolling stock vehicle;
determining the interval grade coefficient further using the interval grade data of the grade data; and
calculating the interval taxing jurisdiction exiting valuation using a taxing jurisdiction exiting valuation algorithm, the interval jurisdiction entering valuation, the interval weather coefficient, the interval load coefficient, the interval grade coefficient, the interval damage coefficient, the interval rate of depreciation, the interval mileage difference of the taxing jurisdiction mileage data, and the interval time difference of the taxing jurisdiction time data.

18. The non-transitory computer readable medium of claim 17, wherein the load data is obtained from a transponder located on the rolling stock vehicle and configured to determine a load on the rolling stock vehicle.

\* \* \* \* \*